T. E. RHINE.

Improvement in Nut-Locks.

No. 133,253.              Patented Nov. 19, 1872.

Witnesses.
C. F. Brown
D. M. Ellsworth

Inventor.
Thomas E. Rhine
By his Attys.
Hill & Ellsworth

UNITED STATES PATENT OFFICE.

THOMAS E. RHINE, OF QUAKER CITY, OHIO.

IMPROVEMENT IN NUT-LOCKS.

Specification forming part of Letters Patent No. 133,253, dated November 19, 1872.

*To all whom it may concern:*

Be it known that I, THOMAS E. RHINE, of Quaker City, in the county of Guernsey and State of Ohio, have invented a new and Improved Nut-Lock; and I do hereby declare the following to be a full, clear, and exact description of the same, reference being had to the accompanying drawing forming part of this specification, in which—

Figure 1:
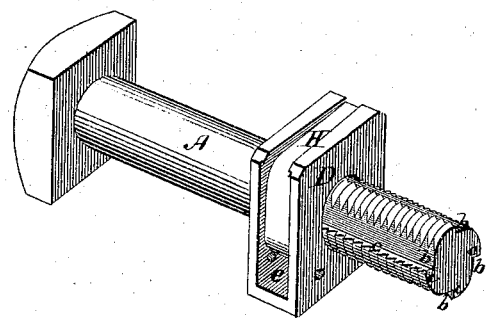
Figure 2:
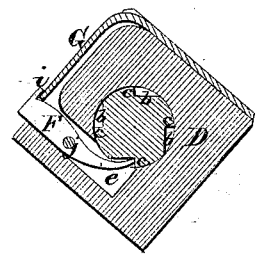
Figure 3:
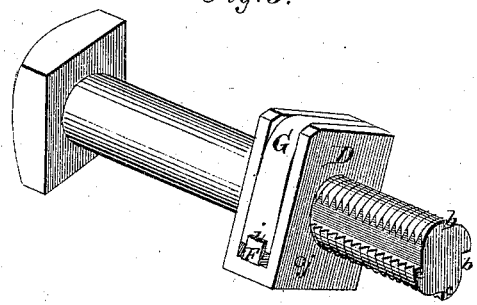

Figure 1 is a perspective view of a bolt and nut with the locking pawl and spring removed; Fig. 2 is a sectional view of the nut and bolt; and Fig. 3 is a perspective view of the nut locked upon the bolt.

Similar letters of reference in the accompanying drawing denote the same parts.

My invention has for its object to provide effective means for locking nuts upon bolts beyond the possibility of displacement by the jarring of machinery or other parts containing the bolt. To this end the invention consists in constructing the nut with recessed edges, within which a pawl and spring are arranged, so that the latter shall hold the pawl engaged with grooves formed longitudinally of the bolt and across the thread thereof, as I will now proceed to describe.

In the accompanying drawing, A is a bolt provided with a series of longitudinal grooves, $b$, extending across the thread, and so formed as to produce shoulders, $c$, on one side, as shown. D is the nut provided with a lateral recess, $e$, in which a pawl, F, is pivoted, so as to engage with the grooves in the bolt. G is a right-angular spring made somewhat tapering at one end, so that it shall slide freely into a dovetailed groove, H, formed in that edge of the nut adjoining the recessed edge $e$. The opposite end of the spring fits under a shoulder, $i$, formed upon the outer end of the pawl to hold the point of the latter within the grooves of the bolt. In applying the locking devices the nut is first placed upon the bolt and the spring fitted within the dovetailed groove H. The pawl is then inserted in the recess, so that it shall enter the grooves of the bolt and engage with the free end of the spring, and is held in place by the pivot $j$, which is now introduced and headed down to prevent accidental removal. The nut may be now set up to the requisite position by any suitable means, the pawl riding freely over the threads and the inclined sides of the grooves for the purpose. Any attempt to unscrew it, however, is resisted by the point of the pawl and the shoulders $c$ of the grooves, as will be readily understood. By this construction it is impossible for the nut to work loose or to be removed from the bolt without first driving out the pivot with some pointed instrument.

Having thus described my invention, what I claim is—

1. In locking nuts upon bolts, a recessed nut containing a pivoted pawl, F, and a spring, G, the latter being adapted to hold the pawl within a shouldered groove formed longitudinally of the bolt and across the thread thereof, substantially as described, for the purpose specified.

2. In combination with the recessed nut and the grooved bolt, the pivoted pawl F and angular spring G, substantially as described, for the purpose specified.

THOMAS E. RHINE.

Witnesses:
E. A. ELLSWORTH,
MELVILLE CHURCH.